*(12)* United States Patent
Minami et al.

(10) Patent No.: US 10,031,219 B2
(45) Date of Patent: Jul. 24, 2018

(54) RADAR AND OBJECT DETECTION METHOD

(71) Applicant: TOYOTA JIDOSHA KABUSHIKI KAISHA, Toyota-shi, Aichi-ken (JP)

(72) Inventors: Yoshiaki Minami, Gotenba (JP); Yuji Oda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 378 days.

(21) Appl. No.: 14/768,091

(22) PCT Filed: Feb. 19, 2013

(86) PCT No.: PCT/JP2013/054009
§ 371 (c)(1),
(2) Date: Aug. 14, 2015

(87) PCT Pub. No.: WO2014/128835
PCT Pub. Date: Aug. 28, 2014

(65) Prior Publication Data
US 2016/0011308 A1    Jan. 14, 2016

(51) Int. Cl.
*G01S 13/28*    (2006.01)
*G01S 7/292*    (2006.01)

(52) U.S. Cl.
CPC .......... *G01S 13/284* (2013.01); *G01S 7/2921* (2013.01)

(58) Field of Classification Search
CPC ..................................................... G01S 13/284
USPC ........................................................ 342/189
See application file for complete search history.

(56) References Cited

U.S. PATENT DOCUMENTS

2008/0136703 A1    6/2008  Yoshimura
2013/0099959 A1*   4/2013  Matsuo .................. G01S 7/282
                                                  342/189

FOREIGN PATENT DOCUMENTS

JP    2008-145236 A    6/2008

* cited by examiner

*Primary Examiner* — Gregory C. Issing
*Assistant Examiner* — Helena H Seraydaryan
(74) *Attorney, Agent, or Firm* — Sughure Mion, PLLC

(57) ABSTRACT

A DS-SS radar 10 detects an object in such a way that a code generator 21, an oscillator 32, and an antenna 24 repeatedly send a sending signal modulated with a predetermined-frequency code generated by the code generator 21, an A/D converter 45 samples the code, included in the reflected wave of the sending signal reflected by an object, with a sampling period lower than the period of the code, and a correlator 46 calculates the correlation between the reference code, generated by re-arranging the code from the code generator 21 at an interval of Nsp, and the sampling data converted by the A/D converter 45.

6 Claims, 8 Drawing Sheets

RADAR AND OBJECT DETECTION METHOD

TECHNICAL FIELD

One embodiment of the present invention relates to a radar and an object detection method.

BACKGROUND ART

A technology for applying equivalent time sampling to a radar has been proposed. For example, Patent Literature 1 discloses an example in which equivalent time sampling is applied to a pulse radar. In the example disclosed in Patent Literature 1, a power control signal generating unit, which generates a power control signal having a variable amplitude to equalize the signal strength of the receiving signal, and an amplifying unit, which controls the sending power of the sending signal in the pulse train form by adjusting the gain according to the amplitude of the power control signal, are provided on the sending side.

CITATION LIST

Patent Literature

Patent Literature 1: Japanese Patent Application Publication No. 2008-145236 (JP 2008-145236 A)

SUMMARY OF THE INVENTION

Problem to be Solved by the Invention

By the way, in equivalent time sampling, there is a disadvantage that it takes long for detecting an object because the sampling period is longer than the period (code length) of the sending signal of a radar and therefore the time, required to acquire all data of the code included in a reflected wave, becomes longer in proportion to about the square of the code length.

In view of the above problem, it is an object of one embodiment of the present invention to provide a radar and an object detection method that can reduce the time required to acquire all data included in a reflected wave for detecting an object more quickly.

Means for Solving the Problem

In one embodiment of the present invention, a radar includes a sending unit that has a code generator and repeatedly sends a sending signal modulated by a code generated by the code generator, the code having a predetermined period; a receiving unit that samples a reflected wave of the sending signal, reflected by an object, with a sampling period lower than the predetermined period; and a detection unit that detects the object by calculating a correlation between re-arranged data and the reflected wave sampled by the receiving unit, the re-arranged data corresponding to data generated by re-arranging the code, generated by the code generator, at an interval corresponding to the sampling period.

According to this configuration, the radar includes the sending unit that has a code generator and repeatedly sends a sending signal modulated by a code generated by the code generator, the code having a predetermined period; the receiving unit that samples a reflected wave of the sending signal, reflected by an object, with a sampling period lower than the predetermined period; and the detection unit that detects the object by calculating a correlation between re-arranged data and the sampling data of the reflected wave sampled by the receiving unit, the re-arranged data corresponding to data generated by re-arranging the code, generated by the code generator, at an interval corresponding to the sampling period. This configuration can reduce the time required to acquire all data, included in the reflected wave, to detect the object more quickly.

In this case, the code is an M sequence code and the sampling period is a period calculated by multiplying Nsp by a width of one chip of the code, Nsp being a number that is smaller than a code length N of the code and is a power of 2.

According to this configuration, the code is an M sequence code and therefore, by setting the sampling period to a period calculated by multiplying Nsp, a number that is smaller than the code length N of the code and is a power of 2, by the width of one chip of the code, the sampling data sampled with the sampling period and the code re-arranged data generated by re-arranging the code with the sampling period become equal to the data generated by cyclically shifting the original code. Therefore, acquiring sampling data with such a sampling period can reduce the time required to acquire all data included in a reflected wave, allowing an object to be detected more quickly through the comparison between the obtained sampling data and the code re-generated data.

In this case, the detection unit can output data generated by further re-arranging correlation output data at an interval of $(N+1)/Nsp$, the correlation output data being acquired by calculating a correlation between the re-arranged data and the reflected wave.

According to this configuration, the detection unit outputs data generated by further re-arranging correlation output data at an interval of $(N+1)/Nsp$, the correlation output data being acquired by calculating a correlation between the re-arranged data and the reflected wave. By doing so, the correlation output data can be output in the order of distances.

The radar further includes a reference code generator that is separate from the code generator wherein the reference code generator generates the re-arranged data corresponding to data generated by re-arranging the code, generated by the code generator, at an interval corresponding to the sampling period and the detection unit detects the object by calculating a correlation between the re-arranged data, generated by the reference code generator, and the reflected wave sampled by the receiving unit.

According to this configuration, the re-arranged data can be generated from the reference code generator, which is separate from the code generator, without generating the re-arranged data by directly re-arranging the code actually generated by the code generator.

In one embodiment of the present invention, an object detection method includes a sending step of repeatedly sending a sending signal modulated by a code generated by a code generator, the code having a predetermined period; a reception step of sampling a reflected wave of the sending signal, reflected by an object, with a sampling period lower than the predetermined period; and a detection step of detecting the object by calculating a correlation between re-arranged data and the reflected wave sampled in the reception step, the re-arranged data corresponding to data generated by re-arranging the code, generated by the code generator, at an interval corresponding to the sampling period.

In this case, the code is an M sequence code, and the sampling period can be set to a period calculated by multiplying Nsp by a width of one chip of the code, Nsp being a number that is smaller than a code length N of the code and is a power of 2.

In this case, in the detection step, data generated by further re-arranging correlation output data at an interval of (N+1)/Nsp can be output, the correlation output data being acquired by calculating a correlation between the re-arranged data and the reflected wave.

The object detection method further includes a reference code generation step of generating from a reference code generator the re-arranged data corresponding to data generated by re-arranging the code, generated by the code generator, at an interval corresponding to the sampling period, the reference code generator being separate from the code generator wherein, in the detection step, the object can be detected by calculating a correlation between the re-arranged data, generated in the reference code generation step, and the reflected wave sampled in the reception step.

Effects of the Invention

According to the radar and the object detection method in one embodiment of the present invention, the time required to acquire all data included in a reflected wave can be reduced to detect an object more quickly.

MODES FOR CARRYING OUT THE INVENTION

Figure 1:
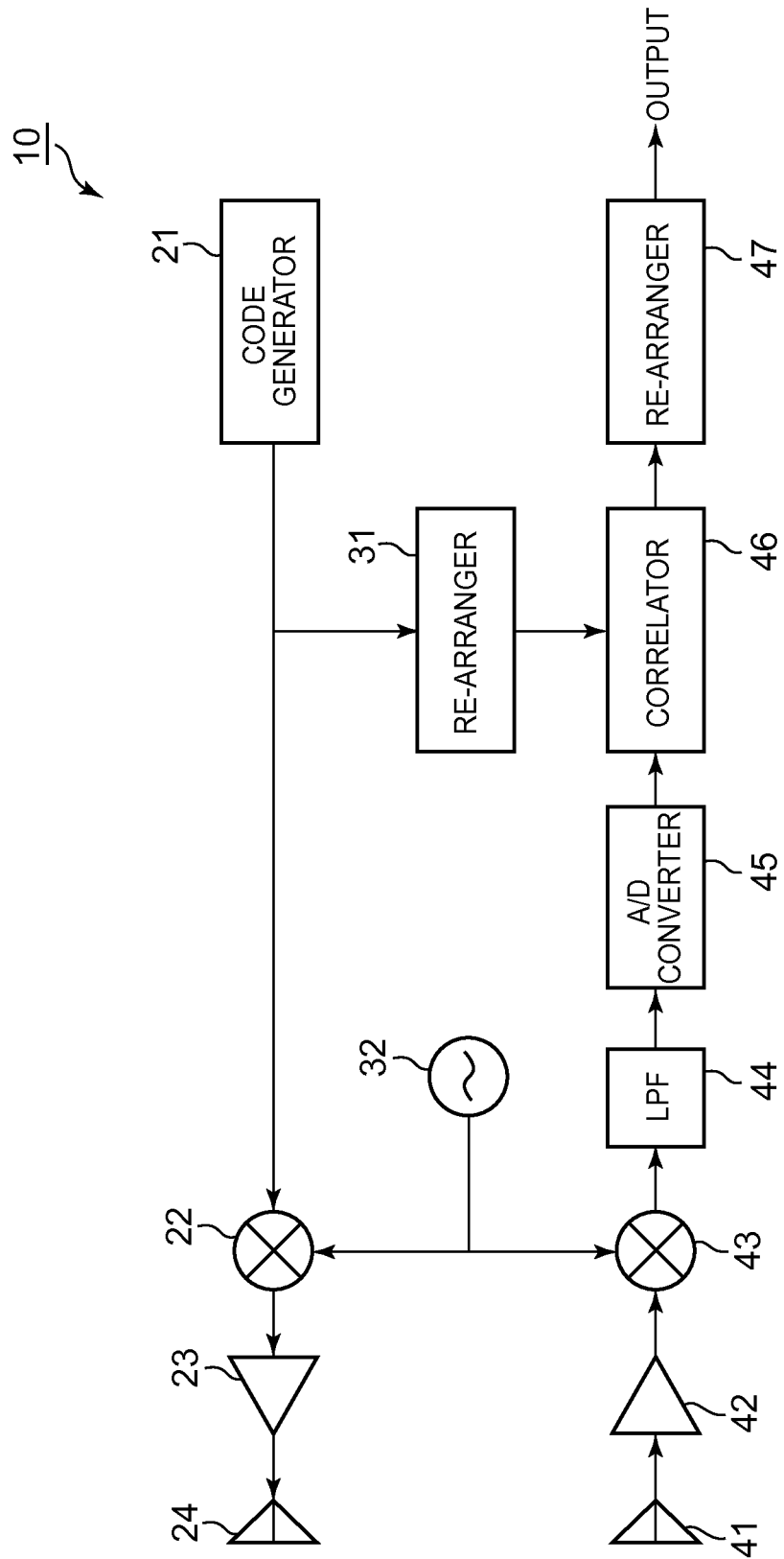
FIG. 1 is a block diagram showing a DS-SS radar in an embodiment.

An example of a radar and an object detection method in an embodiment of the present invention are described below with reference to the drawings. As shown in FIG. 1, a DS-SS radar 10 in the embodiment of the present invention includes a code generator 21, a mixer 22, an amplifier 23, an antenna 24, a re-arranger 31, an oscillator 32, an antenna 41, an amplifier 42, a mixer 43, an LPF 44, an A/D converter 45, a correlator 46, and a re-arranger 47.

The code generator 21 continuously generates an M sequence code. The oscillator 32 generates a carrier frequency signal for carrying a signal. The mixer 22 modulates the carrier frequency signal, generated by the oscillator 32, with the M sequence code, generated by the code generator 21, for generating a sending signal. The amplifier 23 amplifies the power of the sending signal generated by the mixer 22. The antenna 24 sends the sending signal, amplified by the amplifier 23, to the outside of the DS-SS radar 10.

The antenna 41 receives the sending signal, reflected by an object external to the DS-SS radar 10, as a received signal. The amplifier 42 amplifies the power of the received signal received by the antenna 41. The mixer 43 converts the frequency of the received signal, amplified by the amplifier 42, using the carrier frequency signal generated by the oscillator 32. The LPF 44 excludes high-frequency components, included in the output of the mixer 43, to output the baseband signal.

The A/D converter 45 samples the baseband signal, extracted via the mixer 43 and the LPF 44, with the period of the width of Nsp×chip, to generate sampling data where "chip" is one element of the code. The width of one chip is the time during which the code (0 or 1) of one chip is generated. As will be described later, Nsp is an integer that is smaller than N and is a power of 2, where N is the code length of the code.

The re-arranger 31 re-arranges the M sequence code, generated by the code generator 21, at an interval of Nsp to generate the reference code that is used for the correlation processing by the correlator 46. The property of the M sequence code is that the code generated by re-arranging an M sequence code at an interval of Nsp is equal to the code generated by cyclically shifting the original M sequence code and, therefore, the code generated by cyclically shifting the original M sequence code may be used as the reference code for the correlation processing used by the correlator 46.

The correlator 46 calculates the correlation between the sampling data, sampled by the A/D converter 45, and the reference code for correlation processing, generated by the re-arranger 31, and outputs the correlation output data.

The re-arranger 47 re-arranges the correlation output data, output by the correlator 46, at an interval of (N+1)/Nsp and outputs the rearranged correlation output data as the radar output.

Figure 2:
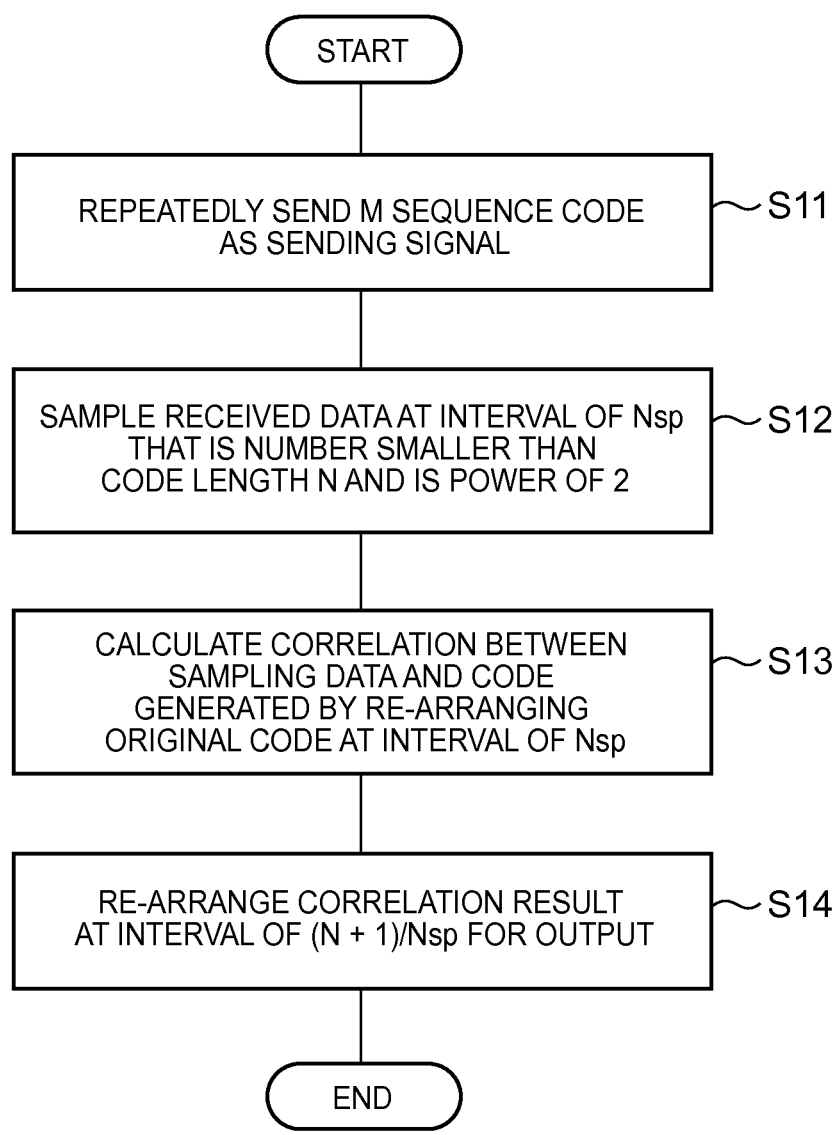
FIG. 2 is a flowchart showing the operation of the DS-SS radar in the embodiment.

The operation of the DS-SS radar 10 in this embodiment is described below. As shown in FIG. 2, the code generator 21, oscillator 32, mixer 22, amplifier 23, and antenna 24 repeatedly send the M sequence coed as the sending signal (S11).

The A/D converter 45 samples the received signal, received via the antenna 41, amplifier 42, oscillator 32, mixer 43, and LPF 44, with a period of the width of Nsp×chip where Nsp is a number smaller than the code length N and is a power of 2 (S12).

Figure 3:
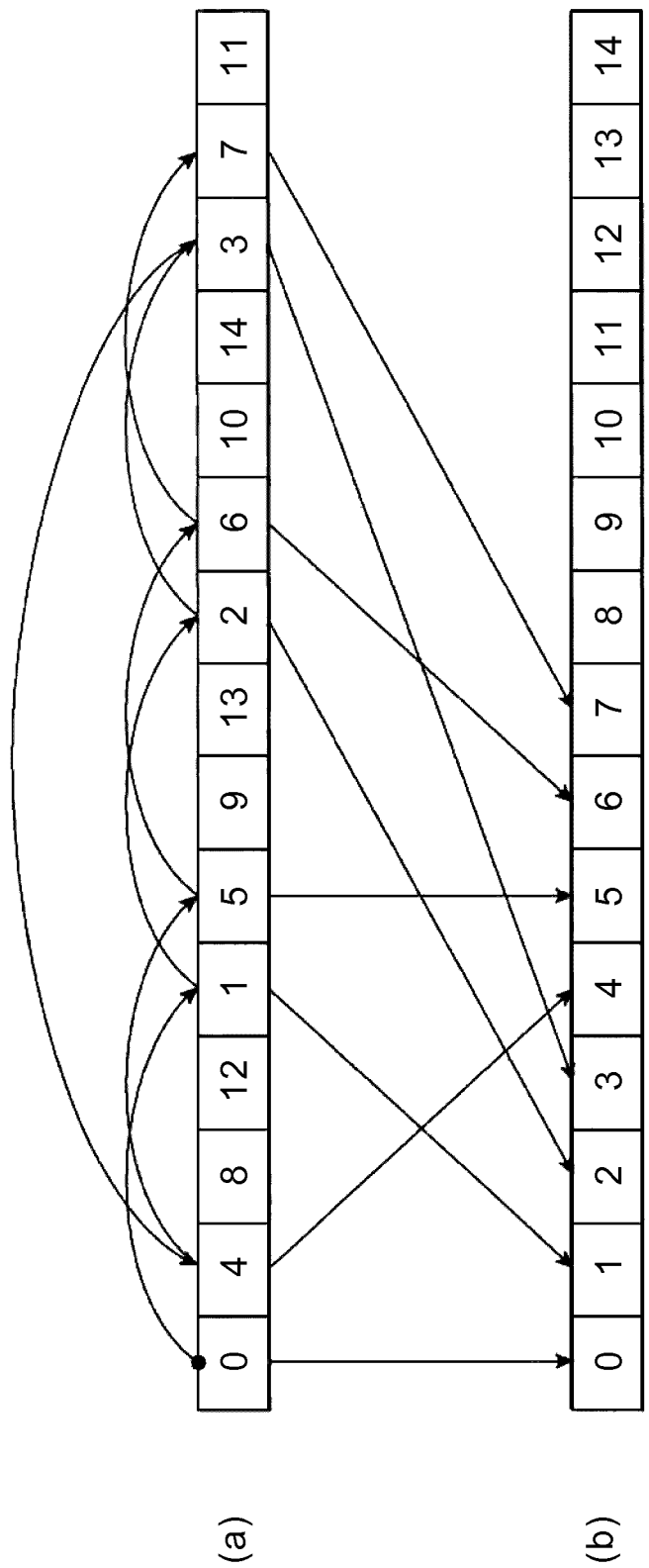
FIG. 3A is a diagram showing a list of correlation outputs and FIG. 3B is a diagram showing an output generated by rearranging A at an interval of (N+1)/Nsp.

The re-arranger 31 re-arranges the M sequence code, generated by the code generator 21, at an interval of Nsp to generate the reference code for the correlation processing. The code generated by re-arranging the M-sequence code at an interval of Nsp is equal to the code that is generated by cyclically shifting the original code. The correlator 46 calculates the correlation between the sampling data, sampled by the A/D converter 45, and the reference code for the correlation processing, generated by the re-arranger 31, and outputs the correlation output data (S13). As a result, though the list of the correlation output should be arranged in the distance order of "0" to "14" when Nsp=4 and N=15, the correlation output data is a list of correlation outputs re-arranged at an interval of Nsp such as that shown in FIG. 3A.

The re-arranger 47 re-arranges the correlation output data, output by the correlator 46, at an interval of (N+1)/Nsp for outputting as the radar output (S14). For example, when Nsp=4 and N=15, the radar output in this case is a list of output, such as the that shown in FIG. 3B, generated by re-arranging the correlation output data, shown in FIG. 3A, at an interval of (N+1)/Nsp=4. In this manner, the correlation output (=detection result), which is arranged in the order of "0" to "14", is reproduced.

In this embodiment, the DS-SS radar 10 detects an object in the following way. That is, the code generator 21, oscillator 32, and antenna 24 repeatedly send the sending signal modulated with the predetermined-frequency code generated by the code generator 21, the A/D converter 45 samples the code, included in the reflected wave of the sending signal reflected by an object, with a sampling period lower than the period of the code, and the correlator 46 calculates the correlation between the reference code, generated by re-arranging the code from the code generator 21 at an interval of Nsp, and the sampling data converted by the A/D converter 45. This processing reduces the time required to acquire all data included in the reflected wave during equivalent time sampling, allowing an object to be detected more quickly.

Figure 4:
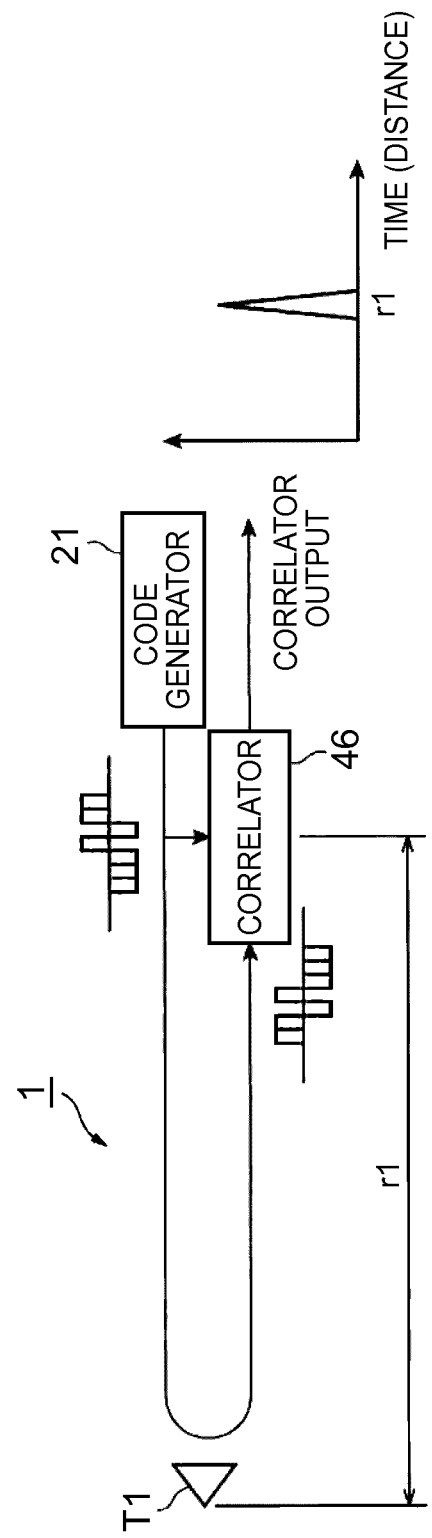
FIG. 4 is a diagram showing the principle by which a conventional DS-SS radar detects a single object.
Figure 5:
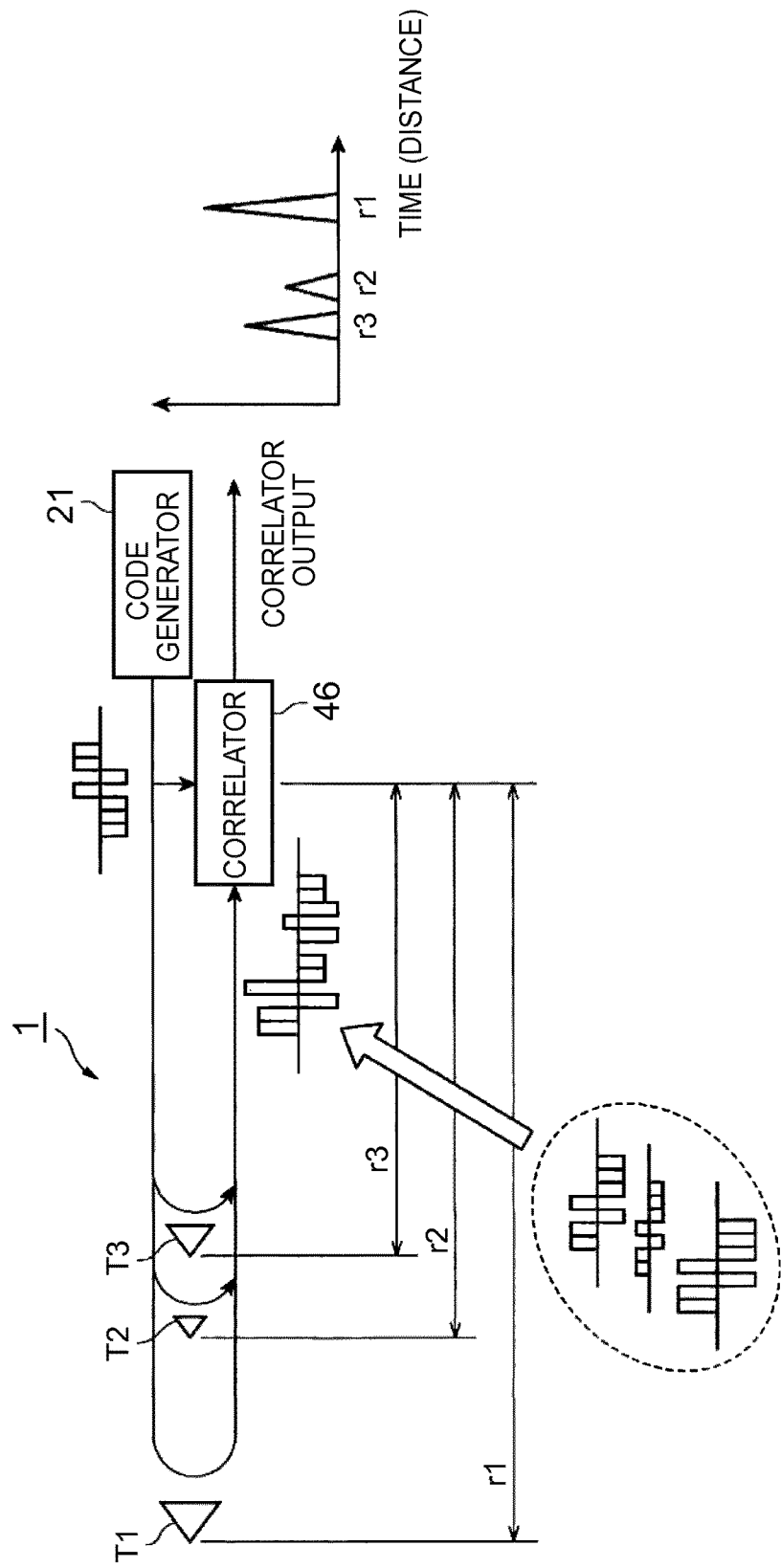
FIG. 5 is a diagram showing the principle by which a conventional DS-SS radar detects a plurality of objects.

As shown in FIG. 4, a conventional DS-SS radar 1 sends the sending signal phase-modulated using the code generated by the code generator 21. The correlator 46 calculates the correlation between the received signal, reflected by an object T1, and the code used for the modulation. This calculation gives the distance r1 between the object T1 and the DS-SS radar 1 based on the time difference between the code, included in the sending signal, and the code included in the received signal. The code generator 21, which generates code having good autocorrelation characteristics, separates a plurality of objects T1 to T3, if present as shown in FIG. 5, to calculate each of the distances r1 to r3 between each of the objects T1 to T3 and the DS-SS radar 1.

Figure 6:
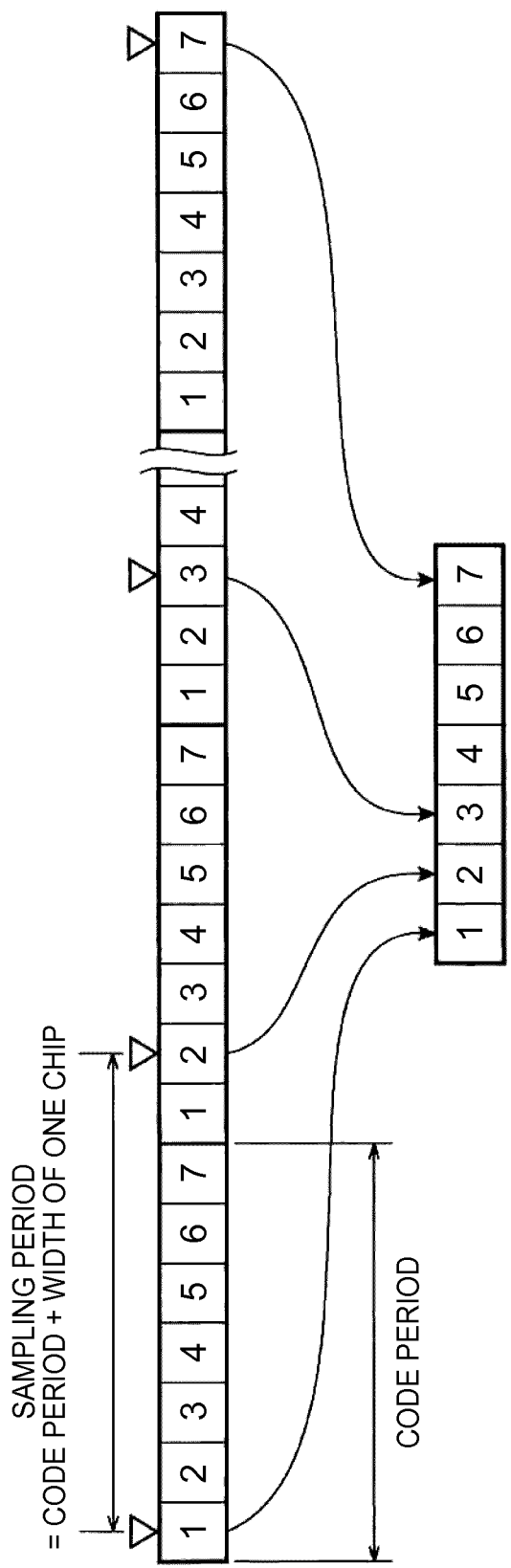
FIG. 6 is a diagram showing the principle of equivalent time sampling.

For example, for code having the code length of N=7 and arranged in the order of the code elements "1" to "7" as shown in FIG. 6, equivalent time sampling is performed conventionally with a period of the width of (code period+width of one chip)=(N+1)×chip=8×chip. This allows a code string to be restored even by low-speed sampling. However, in the conventional sampling method, sampling must be performed with a period of the width of (N+1)×chip while repeatedly sending the code with the code length of N.

Figure 7:
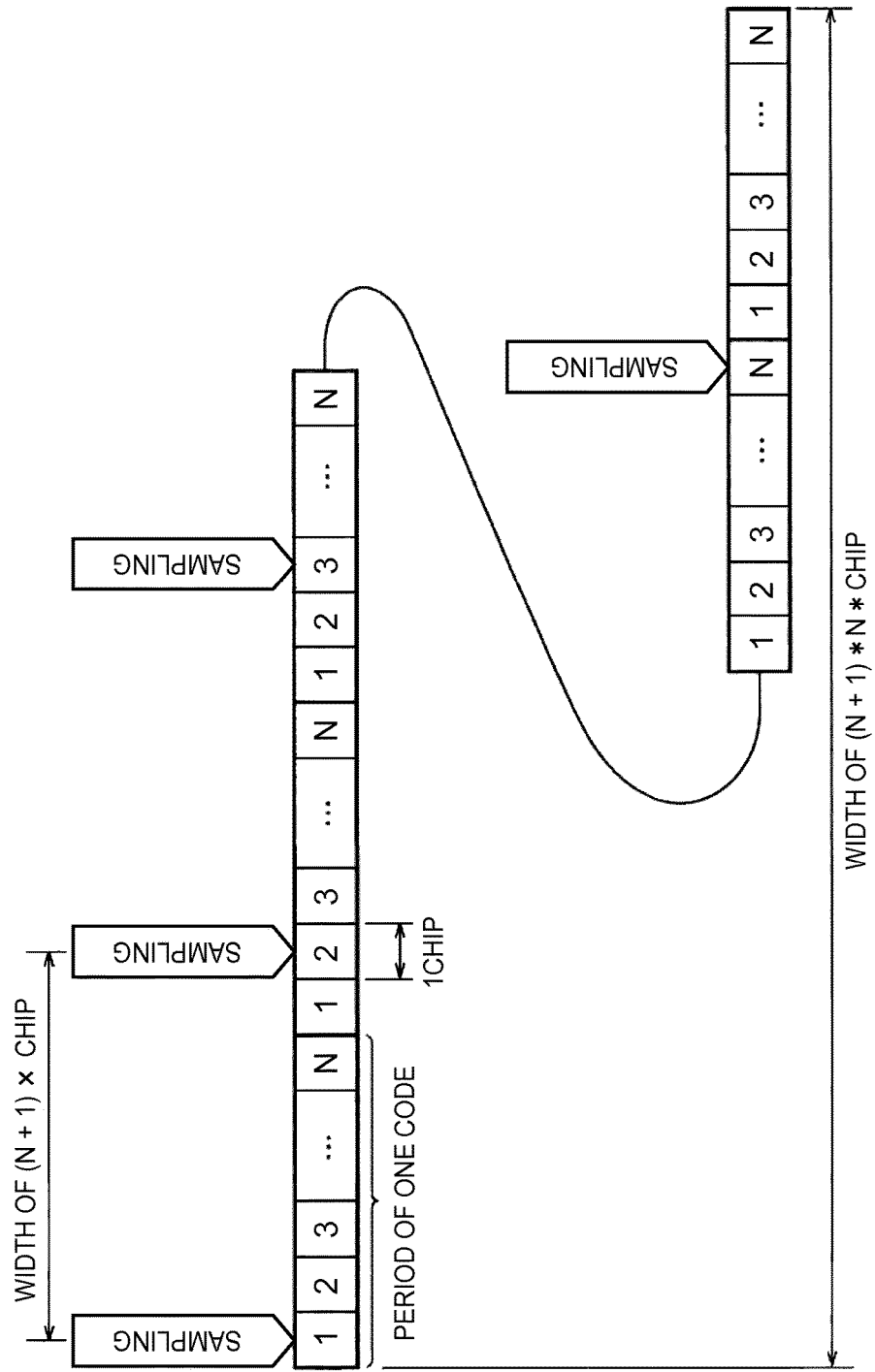
FIG. 7 is a diagram showing the data acquisition time required for equivalent time sampling.

Therefore, as shown in FIG. 7, this sampling method requires the time with the width of (N+1)×N×chip to acquire all data. The longer the code is, the higher the spread gain is and the higher the detection performance of the DS-SS radar is. However, in the conventional equivalent time sampling, the time for acquiring all data is increased in proportion to about the square of the code length N, meaning that, if the code length N of the code is long, the time for acquiring all data becomes extremely long.

On the other hand, the time required for acquiring data necessary for detecting an object can be reduced in this embodiment to the time with the width of Nsp×N×chip. Moreover, in addition to reducing the time for acquiring data, the speed of an object can be detected at the same time in this embodiment. The DS-SS radar 10 detects the speed relative to an object using the phase change (frequency) in the received signal caused by the Doppler shift. In this embodiment, because the processing can be performed without re-arranging the array of acquired data until the correlation processing is performed by the correlator 46, the continuity of the phase change can be maintained and the speed of an object can be detected. In addition, sampling can be performed in this embodiment with a sampling period compatible with the performance of the A/D converter 45 that is used. This maximizes the performance of the A/D converter 45.

The code used in this embodiment is an M sequence code. This means that, by using the sampling period as a period calculated by multiplying Nsp, which is smaller than the code length and is a power of 2, by the width of one chip of the code, the sampling data, sampled with the sampling period, and the reference code, generated by re-arranging the code with the sampling period, become equal to the code generated by cyclically shifting the original code. Therefore, acquiring sampling data with such a sampling period can reduce the time required to acquire all data included in the reflected wave and, in addition, calculating the correlation between the acquired sampling data and the reference code allows an object to be detected more quickly.

In addition, the re-arranger 47 in this embodiment re-arranges the correlation output data, which is acquired by calculating the correlation between the reference code and the sampling data, at an interval of (N+1)/Nsp to produce the radar output. This allows the correlation output data to be output as a list of data in the order of the distance.

Figure 8:
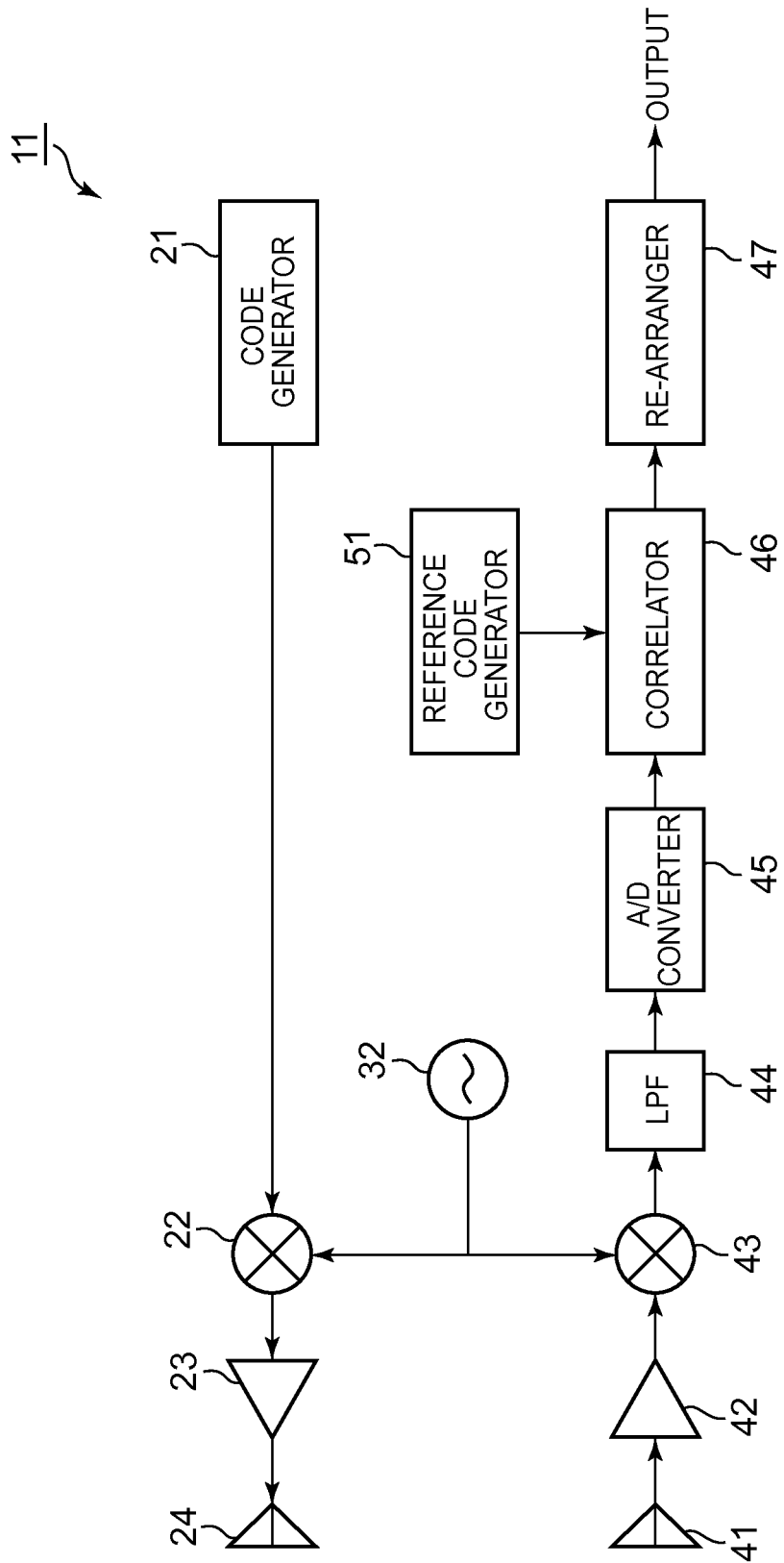
FIG. 8 is a block diagram showing a DS-SS radar in another embodiment.

The present invention is not limited to the embodiment described above, but various modifications are possible. For example, in the above embodiment, the re-arranger 31 directly re-arranges the code, actually generated by the code generator 21, for generating the reference code for the correlation processing. However, if the code length N and the sampling interval Nsp are designed as fixed values, a reference code generator 51 may be provided as shown in a DS-SS radar 11 in FIG. 8. This reference code generator 51 generates the reference code, corresponding to the data generated by re-arranging the code, which is generated by the code generator 21 and has the code length of N, at a sampling interval of Nsp, separately from the code generator 21 and the re-arranger 31. The correlator 46 can detect an object in the same manner as in the above embodiment by calculating the correlation between the reference code from the reference code generator 51 and the reflected wave.

INDUSTRIAL APPLICABILITY

According to the radar and the object detection method in one embodiment of the present invention, the time required for acquiring all data included in a reflected wave can be reduced to detect an object more quickly.

DESCRIPTION OF THE REFERENCE NUMERALS

1 DS-SS radar
10, 11 DS-SS radar
21 Code generator
22 Mixer
23 Amplifier
24 Antenna
31 Re-arranger
32 Oscillator
41 Antenna
42 Amplifier
43 Mixer
44 LPF
45 A/D converter
46 Correlator
47 Re-arranger
51 Reference code generator

The invention claimed is:
1. A radar comprising:
a sender that has a code generator and repeatedly sends a sending signal modulated by a code generated by the code generator, the code having a predetermined period;
a receiver that samples a reflected wave of the sending signal, reflected by an object, with a sampling period lower than the predetermined period; and
a detector that detects the object by calculating a correlation between re-arranged data and the reflected wave sampled by the receiver, the re-arranged data corresponding to data generated by re-arranging the code, generated by the code generator, at an interval corresponding to the sampling period, wherein the code is an M sequence code, and the sampling period is a period calculated by multiplying Nsp by a width of one chip of the code, Nsp being a number that is smaller than a code length N of the code and is a power of 2.

2. The radar according to claim 1, wherein the detector outputs data generated by further re-arranging correlation output data at an interval of (N+1)/Nsp, the correlation output data being acquired by calculating the correlation between the re-arranged data and the reflected wave.

3. The radar according to claim 1, further comprising a reference code generator that is separate from the code generator wherein the reference code generator generates the re-arranged data corresponding to data generated by re-arranging the code, generated by the code generator, at the interval corresponding to the sampling period and the detector detects the object by calculating a correlation between the re-arranged data, generated by the reference code generator, and the reflected wave sampled by the receiver.

4. An object detection method comprising:

a sending step of repeatedly sending a sending signal modulated by a code generated by a code generator, the code having a predetermined period;

a reception step of sampling a reflected wave of the sending signal, reflected by an object, with a sampling period lower than the predetermined period; and a detection step of detecting the object by calculating a correlation between re-arranged data and the reflected wave sampled in the reception step, the re-arranged data corresponding to data generated by re-arranging the code, generated by the code generator, at an interval corresponding to the sampling period, wherein the code is an M sequence code, and the sampling period is a period calculated by multiplying Nsp by a width of one chip of the code, Nsp being a number that is smaller than a code length N of the code and is a power of 2.

5. The object detection method according to claim 4 wherein in the detection step, data generated by further re-arranging correlation output data at an interval of (N+1)/Nsp is output, the correlation output data being acquired by calculating the correlation between the re-arranged data and the reflected wave.

6. The object detection method according to claim 4, further comprising a reference code generation step of generating from a reference code generator the re-arranged data corresponding to data generated by re-arranging the code, generated by the code generator, at an interval corresponding to the sampling period, the reference code generator being separate from the code generator wherein in the detection step, the object is detected by calculating a correlation between the re-arranged data, generated in the reference code generation step, and the reflected wave sampled in the reception step.

* * * * *